US012559080B2

(12) United States Patent
Usui

(10) Patent No.: US 12,559,080 B2
(45) Date of Patent: Feb. 24, 2026

(54) ELECTRIC ACTUATOR AND VEHICLE DRUM BRAKE INCLUDING THE SAME

(71) Applicant: Hitachi Astemo, Ltd., Ibaraki (JP)

(72) Inventor: Koji Usui, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 380 days.

(21) Appl. No.: 18/036,068

(22) PCT Filed: Oct. 29, 2021

(86) PCT No.: PCT/JP2021/040011
§ 371 (c)(1),
(2) Date: May 9, 2023

(87) PCT Pub. No.: WO2022/107574
PCT Pub. Date: May 27, 2022

(65) Prior Publication Data
US 2024/0017710 A1 Jan. 18, 2024

(30) Foreign Application Priority Data

Nov. 18, 2020 (JP) ................................. 2020-191983

(51) Int. Cl.
*B60T 13/74* (2006.01)
*B01D 46/00* (2022.01)
(Continued)

(52) U.S. Cl.
CPC ........ *B60T 13/746* (2013.01); *B01D 46/0027* (2013.01); *B01D 46/10* (2013.01);
(Continued)

(58) Field of Classification Search
CPC ............. F16H 2025/2081; F16H 25/24; F16H 2025/2037; F16H 57/027;
(Continued)

(56) References Cited

U.S. PATENT DOCUMENTS 4,747,319 A * 5/1988 Sakuta ................... F16H 25/20
74/89.41
8,485,054 B2 * 7/2013 Tateishi ............... H02K 7/1023
74/89.23
(Continued)

FOREIGN PATENT DOCUMENTS

EP 3 418 140 12/2018
JP 2017-180678 10/2017
(Continued)

OTHER PUBLICATIONS

International Search Report issued Jan. 11, 2022 in corresponding International Application No. PCT/JP2021/040011, with English language translation.
(Continued)

*Primary Examiner* — Henry Y Liu
(74) *Attorney, Agent, or Firm* — Wenderoth, Lind & Ponack, L.L.P.

(57) ABSTRACT

An electric actuator includes a forwardly and reversely rotatable electric motor, a motion conversion mechanism configured to convert rotation of the electric motor into reciprocating linear motion of a screw shaft, an actuator case containing the electric motor and the motion conversion mechanism, and a boot covering a portion of the screw shaft that extends out of the actuator case. A vent is formed on the actuator case. The vent is configured to ventilate a sealingly closed space in the actuator case and the boot. A breathable waterproof member is provided on the vent and a cover member is also provided on the vent. The breathable waterproof member is configured to block entry and exit of water while permitting entry and exit of air. The cover member is configured to cover the vent so as to allow ventilation with outer air.

7 Claims, 8 Drawing Sheets

FRONT ◄————————————► REAR

(51) Int. Cl.

| | |
|---|---|
| *B01D 46/10* | (2006.01) |
| *B60T 1/06* | (2006.01) |
| *F16D 51/22* | (2006.01) |
| *F16D 65/22* | (2006.01) |
| *F16D 121/24* | (2012.01) |
| *F16D 125/40* | (2012.01) |
| *F16D 125/48* | (2012.01) |
| *F16D 125/60* | (2012.01) |
| *F16H 25/20* | (2006.01) |
| *F16H 25/24* | (2006.01) |

(52) U.S. Cl.

CPC ............. *B60T 1/067* (2013.01); *F16D 51/22* (2013.01); *F16D 65/22* (2013.01); *F16H 25/24* (2013.01); *F16D 2121/24* (2013.01); *F16D 2125/40* (2013.01); *F16D 2125/48* (2013.01); *F16D 2125/60* (2013.01); *F16H 2025/2031* (2013.01); *F16H 2025/2037* (2013.01); *F16H 2025/2081* (2013.01)

(58) Field of Classification Search

CPC .. F16H 2025/2031; F16H 25/20; F16D 51/22; F16D 65/22; F16D 2121/24; F16D 2125/40; F16D 2125/48; F16D 2125/60; F16D 65/09; B60T 13/746; B60T 13/741; B60T 13/74; B60T 1/067; F16J 3/04; H02K 7/06; H02K 5/10; H02K 2205/09; B01D 46/0027; B01D 46/10

USPC ........................................................ 188/325

See application file for complete search history.

(56) References Cited

U.S. PATENT DOCUMENTS

| | | | | |
|---|---|---|---|---|
| 10,718,412 | B2 * | 7/2020 | Matsuto | G01D 5/245 |
| 10,883,446 | B2 * | 1/2021 | Werquin | F16H 25/2454 |
| 11,054,016 | B2 * | 7/2021 | Matsuto | F16H 25/2204 |
| 11,149,829 | B2 * | 10/2021 | Matsuto | H02K 7/06 |
| 11,152,840 | B2 * | 10/2021 | Matsuto | G01D 5/145 |
| 11,162,565 | B2 * | 11/2021 | Matsuto | H02K 7/06 |
| 11,215,266 | B2 * | 1/2022 | Matsuto | F16H 25/22 |
| 11,408,492 | B2 * | 8/2022 | Shimizu | F16H 57/027 |
| 2007/0151794 | A1 * | 7/2007 | Mizutani | B62D 5/0448 180/444 |
| 2014/0373526 | A1 * | 12/2014 | Ohnishi | B60T 7/042 60/545 |
| 2019/0092399 | A1 * | 3/2019 | Matsuto | F16H 25/2418 |
| 2019/0093750 | A1 * | 3/2019 | Matsuto | F16H 25/22 |
| 2019/0107184 | A1 * | 4/2019 | Matsuto | F16H 57/02 |
| 2019/0118854 | A1 * | 4/2019 | Tate | B62D 5/001 |
| 2019/0242466 | A1 * | 8/2019 | Brieschke | F16H 55/171 |
| 2019/0264788 | A1 * | 8/2019 | Shimizu | F16H 25/20 |
| 2019/0376585 | A1 * | 12/2019 | Buchanan | A63B 22/0664 |
| 2020/0292039 | A1 * | 9/2020 | Matsuto | H02K 7/116 |
| 2020/0300344 | A1 * | 9/2020 | Matsuto | F16H 25/20 |
| 2021/0246973 | A1 * | 8/2021 | Shimizu | F16H 25/2204 |

FOREIGN PATENT DOCUMENTS

| | | |
|---|---|---|
| JP | 2017-184476 | 10/2017 |
| JP | 2019-6223 | 1/2019 |
| JP | 2019-48587 | 3/2019 |
| JP | 2020-3034 | 1/2020 |
| WO | 2013/047765 | 4/2013 |

OTHER PUBLICATIONS

Written Opinion of the International Searching Authority issued Jan. 11, 2022 in corresponding International Application No. PCT/JP2021/040011, with English language translation.

Office Action issued Apr. 23, 2025 in corresponding Chinese Patent Application No. 202180076228.7, with machine translation.

* cited by examiner

TOP

REAR ← → FRONT

BOTTOM

ELECTRIC ACTUATOR AND VEHICLE DRUM BRAKE INCLUDING THE SAME

TECHNICAL FIELD

The present invention relates to an electric actuator including a motion conversion mechanism that converts a rotation of a forwardly and reversely rotatable electric motor into a reciprocating linear motion of a screw shaft, and a vehicle drum brake including this electric actuator.

BACKGROUND ART

An electric actuator includes a forwardly and reversely rotatable electric motor and a motion conversion mechanism that converts a rotation of this electric motor into a reciprocating linear motion of a screw shaft. When a nut of the motion conversion mechanism is rotated forwardly and reversely by the electric motor, the screw shaft, which is threadedly inserted through this nut so as to be able to advance and retreat, linearly reciprocates. Such an electric actuator is used in, for example, an electric parking brake apparatus of a vehicle drum brake (for example, refer to PTL 1).

In the electric parking brake apparatus including this electric actuator, when a parking brake lever in the drum brake is moved from a release position to an actuation position via a pulling means according to the reciprocating linear motion of the screw shaft of the electric actuator, brake shoes are pressed against the inner peripheral surface of a brake drum that rotates together with a wheel and the rotation of the wheel is braked due to a frictional resistance force generated between them, as a result of which the vehicle is brought into a parking brake state. Then, when the electric motor of the electric actuator is rotated reversely from the parking brake state, the parking brake lever is moved from the actuation position to the release position and the brake shoes are separated from the inner peripheral surface of the brake drum, as a result of which the parking brake state of the vehicle is released.

Then, in the electric actuator, the electric motor and the motion conversion mechanism are contained in a sealingly closed space in an actuator case, but a portion of the screw shaft of the motion conversion mechanism that extends out of the actuator case is covered with an extensible and compressible bellows-like boot.

Then, in the electric actuator, when the screw shaft of the motion conversion mechanism linearly reciprocates as described above, the volume of the sealingly closed space in the actuator case changes and a pressure difference is generated therein. More specifically, when the screw shaft advances in the direction from the actuation position to the release direction to cause the boot to extend, the volume of the sealingly closed space increases and a negative pressure is generated in this sealingly closed space, as a result of which the boot dents due to this negative pressure. Conversely, when the screw shaft retreats from the release position to the actuation position to cause the boot to contract, the volume of the sealingly closed space reduces and a positive pressure is generated in this sealingly closed space, as a result of which the boot expands due to this positive pressure. A repetition of such denting and expansion of the boot raises a problem that this boot is overloaded and the durability thereof reduces. The boot also dents and expands due to a change in the altitude (the atmospheric pressure) and the temperature under which this electric actuator is disposed, besides the above-described increase/ reduction in the volume of the sealingly closed space according to the reciprocating linear motion of the screw shaft.

In light thereof, PTL 2 proposes a mechanism in which a ventilation unit is attached to a gear case defining a sealingly closed space together with a motor case, and the sealingly closed space and the atmosphere are in communication with each other via a vent extending through a partition wall of the motor case, an air flow path formed between the motor case and the gear case, and the ventilation unit, by which the inner pressure in the sealingly closed space is adjusted through the communication between the sealingly closed space and the atmosphere (a breather mechanism).

CITATION LIST

Patent Literature

PTL 1: Japanese Patent Application Public Disclosure No. 2019-006223
PTL 2: Japanese Patent Application Public Disclosure No. 2020-003034

SUMMARY OF INVENTION

Technical Problem

However, the configuration proposed by PTL 2 necessitates the formation of the air flow path between the motor case and the gear case along with the formation of the vent through the partition wall of the motor case, and further necessitates the attachment of the ventilation unit prepared as a different member to the gear case, thereby raising a problem of causing an increase in the number of components and the complication of the structure, and leading to a cost increase accompanying them.

The present invention has been made in consideration of the above-described problems, and is directed to providing an electric actuator capable of inhibiting a change in the inner pressure in the actuator to thus achieve the improvement of the durability of a boot with a simple structure without causing an increase in the number of components and the complication of the structure and leading to a cost increase accompanying them, and a vehicle drum brake including this electric actuator.

Solution to Problem

To achieve the above-described object, according to a first feature of the present invention, an electric actuator includes a forwardly and reversely rotatable electric motor, a motion conversion mechanism configured to convert a rotation of the electric motor into a reciprocating linear motion of a screw shaft, an actuator case containing the electric motor and the motion conversion mechanism, and a hoot covering a portion of the screw shaft that extends out of the actuator case. A vent is formed on the actuator case. The vent is configured to ventilate a sealingly closed space in the actuator case and the boat. A breathable waterproof member is provided on the vent and a cover member is also provided on the vent. The breathable waterproof member is configured to block entry and exit of water while permitting entry and exit of air. The cover member is configured to cover the vent so as to allow ventilation with outer air.

According to a second feature of the present invention, in addition to the - first feature, the actuator case includes a first case containing the electric motor and a second case containing the motion conversion mechanism. The vent is formed near the screw shaft on the second case.

According to a third feature of the present invention, in addition to the first or second feature, the breathable waterproof member is provided on one side of the vent where the sealingly closed space is located, and a filter is provided on the other side of the vent where the cover member is located.

According to a fourth feature of the present invention, in addition to the third feature, at least one of the breathable waterproof member or the filter is fixed to the vent by heat sealing.

According to a fifth feature of the present invention, a vehicle drum brake is configured to spread open/contract a brake shoe provided on a backing plate by the electric actuator according to any of the first to fourth features, thereby pressing/stopping pressing the brake shoe against an inner periphery of a brake drum that rotates together with a wheel to generate/release a required braking force. The cover member is a mounting tubular portion for fixing the electric actuator to the backing plate.

According to a sixth feature of the present invention, in addition to the fifth feature, the mounting tubular portion is integrally formed on the backing plate, and the portion of the screw shaft that extends out of the actuator case is inserted in the mounting tubular portion, by which the electric actuator is fixed to the backing plate.

According to a seventh feature of the present invention, in addition to the fifth feature, the mounting tubular portion is attached to the backing plate via a mounting member fixed to the backing plate, and the portion of the screw shaft that extends out of the actuator case is inserted in the mounting tubular portion, by which the electric actuator is fixed to the backing plate.

According to an eighth feature of the present invention, in addition to the seventh feature, the mounting tubular portion is a tubular member, and a discharge port is formed near a lowermost portion thereof.

Advantageous Effects of Invention

According to the first feature of the present invention, the electric actuator establishes the communication of the sealingly closed space in the actuator case and the boot to the atmosphere with the simple structure of only forming the vent on the actuator case, thereby inhibiting a change in the inner pressure in the sealingly closed space that otherwise would he caused due to the sliding motion of the screw shaft or due to a change in the altitude or the temperature. Therefore, the electric actuator can inhibit the expansion and the contraction of the boot to thus achieve the improvement of the durability thereof with the simple structure without causing an increase in the number of components and the complication of the structure and leading to a cost increase accompanying them. Further, water can be securely prevented from entering the sealingly closed space via the vent due to the breathable waterproof member provided on the vent, and therefore high operational stability of the electric actuator can be maintained. Further, due to the provision of the cover member that covers the vent, the vent is kept from being exposed to the atmosphere, and entry of a foreign object from outside can be blocked.

According to the second feature of the present invention, the electric actuator includes the vent formed near the screw shaft on the first case of the actuator, and therefore can effectively inhibit a change in the pressure in the boot according to the sliding motion of the screw shaft and thus achieve the improvement of the durability and the sealing performance of the boot.

According to the third feature of the present invention, the electric actuator includes the breathable waterproof member provided on the sealingly closed space side of the vent and the filter provided on the cover member side of this vent, thereby removing the foreign object contained in the outer air by the filter and preventing the breathable waterproof member from being clogged due to the foreign object Therefore, the function of the breathable waterproof member is kept from being impaired, and this breathable waterproof member can stably maintain a high performance.

According to the fourth feature of the present invention, the electric actuator allows at least one of the breathable waterproof member or the filter to be easily fixed by heat sealing.

According to the fifth feature of the present invention, the vehicle drum brake uses the mounting tubular portion for fixing the electric actuator to the backing plate provided to the vehicle drum brake as the cover member, and therefore can reduce the number of components and achieve a weight reduction and a cost reduction.

According to the sixth feature of the present invention, the electric actuator can be easily attached to the vehicle drum brake using the mounting tubular portion formed integrally with the backing plate, Further, because the portion of the screw shaft that extends out of the actuator case is inserted in the mounting tubular portion, the boot covering the portion of the screw shaft that extends out of the actuator case is protected by the mounting tubular portion, and this boot is prevented from incurring damage due to an external force, thereby enhancing the durability thereof.

According to the seventh feature of the present invention, the electric actuator is configured to be mounted on the backing plate using the mounting tubular portion configured as a different member from the backing plate, and therefore the position at which this electric actuator is mounted can be easily changed. Further, because the portion of the screw shaft that extends out of the actuator case is inserted in the mounting tubular portion, the boot covering the portion of the screw shaft that extends out of the actuator case is protected by the mounting tubular portion, and this boot is prevented from incurring damage due to an external force, thereby enhancing the durability thereof.

According to the eighth feature of the present invention, the discharge port is formed near the lowermost portion of the mounting tubular portion that is the tubular member, and therefore ventilation in the mounting portion is excellently conducted via this discharge port, and water and the like introduced into the mounting portion can be discharged to outside via the discharge port.

REFERENCE SIGNS LIST

Figure 1:
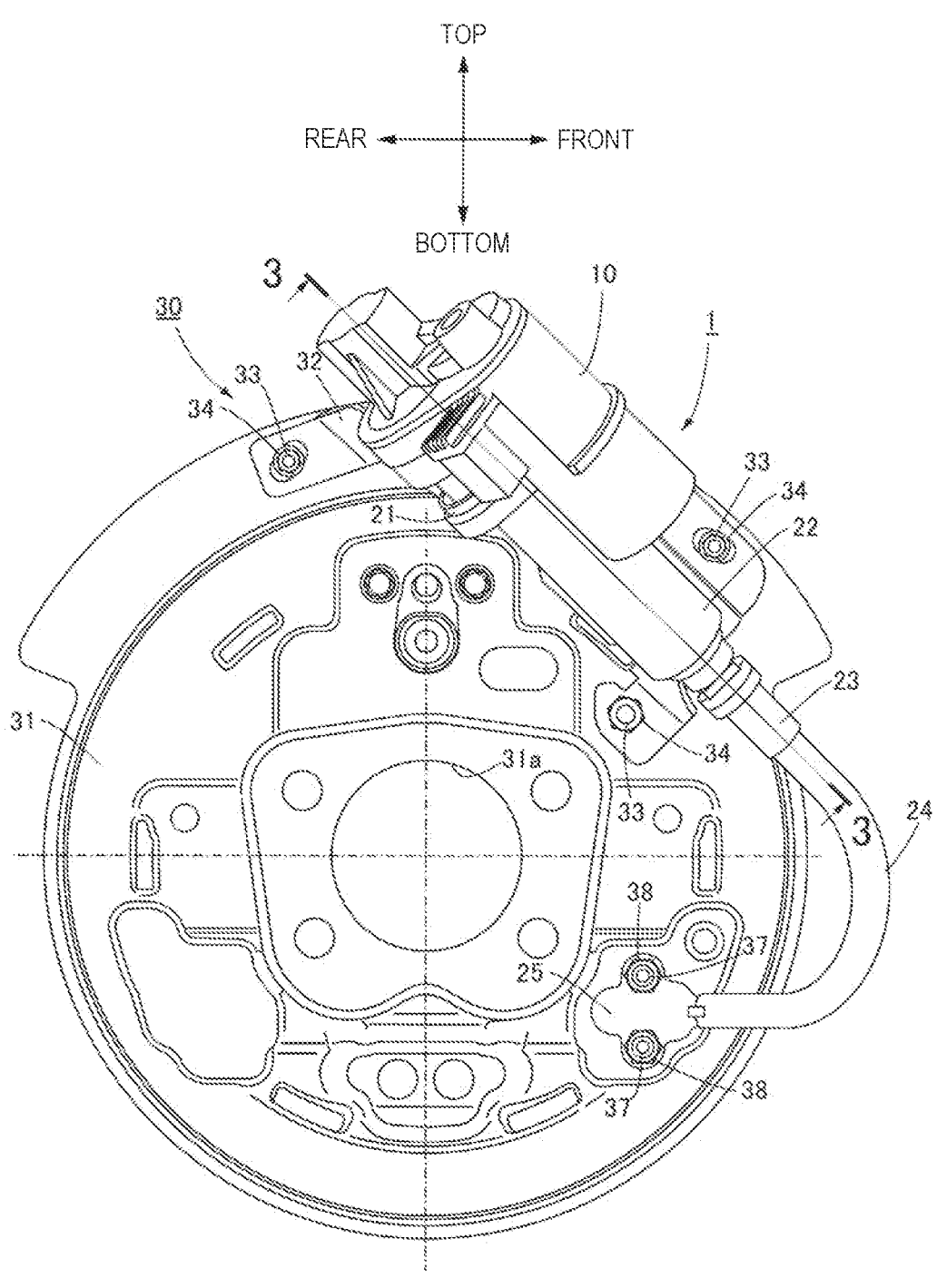
FIG. 1 is a front view of main portions of a vehicle drum brake according to the present invention.

1 electric actuator
2 electric motor
2*a* output shaft of electric motor
3 screw shaft
4 motion conversion mechanism
5 transmission mechanism
8 nut
10 actuator case
11 case main body
11A first case of case main body
11B second cases of case main body
15 boot
22 mounting tubular portion (cover member)
22*a* discharge port of mounting tubular portion
29 vent
30 vehicle drum brake
31 backing plate
32 mounting bracket (mounting member)
40 breathable waterproof member
41 filter

DESCRIPTION OF EMBODIMENTS

In the following description, embodiments of the present invention will be described with reference to the accompanying drawings.
[Vehicle Drum Brake]

First, the schematic configuration of a vehicle drum brake according to the present invention will be described now with reference to FIGS. 1 to 3.

Figure 2:
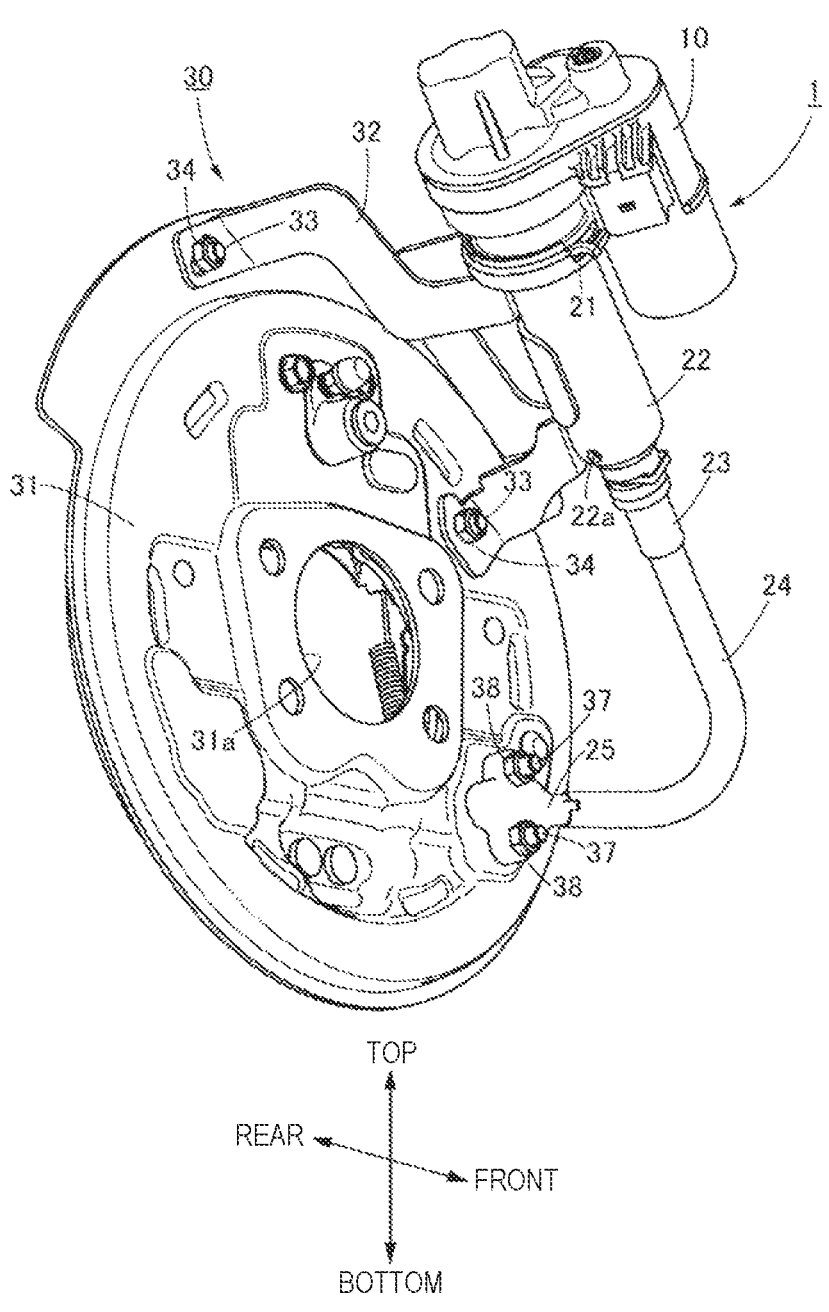
FIG. 2 is a perspective view of the main portions of the vehicle drum brake according to the present invention.

FIG. 2 is a front view of main portions of the vehicle drum brake according to the present invention. FIG. 2 is a perspective view of the main portions of this vehicle drum brake. FIG. 3 is a cross-sectional view taken along a line 3-3 illustrated in FIG. 1.

A vehicle drum brake 30 according to the present invention is intended to be mounted on each wheel of a vehicle, and is equipped with an electric parking brake apparatus for electrically locking a rotation of the wheel when the vehicle is parked.

The vehicle drum brake 30 includes a disk-shaped backing plate 31 fixed to the vehicle body side, and a circular hole 31*a* is formed at the center of this hacking plate 31. A not-illustrated axle is inserted through the circular hole 31*a*. Then, a pair of circular arc-shaped (arched) brake shoes, a rotatable parking brake lever, a return spring, a wheel cylinder, an automatic adjuster, and the like are mounted on the back surface side (the back side in the direction vertical to the paper of FIG. 1) of this backing plate 31, although they are not illustrated. The pair of brake shoes is contactable to and separable from the inner peripheral surface of a brake drum that rotates together with the wheel. The parking brake lever spreads open these brake shoes with the aid of the function of an electric actuator 1 according to the present invention, thereby pressing the brake shoes against the inner peripheral surface of the brake drum. The return spring biases the pair of brake shoes in a closing direction (a direction away from the inner peripheral surface of the brake drum). The wheel cylinder operates according to a hydraulic pressure generated in a master cylinder in reaction to an operation on a brake pedal, thereby pressing the pair of brake shoes against the inner peripheral surface of the brake drum. The automatic adjuster functions to automatically adjust a radial space between the brake shoes and the brake drum.

Then, the above-described electric actuator 1. for driving the electric parking brake apparatus is mounted in an obliquely tilted state via a mounting tubular portion 22 engaged with a mounting bracket 32 at an upper portion of the front side of the backing plate 31. More specifically, the electric actuator 1 is mounted in an obliquely tilted state in such a manner that the extension end (the front end) of a screw shaft 3 (refer to FIG. 3) is located on the lower side. The mounting tubular portion 22 also has a function as a cover member that covers a vent 29 of the electric actuator 1, which will be described below.

Now, the mounting bracket 32 is a metal plate member configured as a different member from the backing plate 31, and is attached to the surface of the backing plate 31 at three portions thereof using studs 33 and nuts 34 threadedly engaged with them as illustrated in FIGS. 1 and 2. The electric actuator 1 is mounted and supported in a state that a snap ring 21 wound around the outer periphery of an actuator case 10 of the electric actuator 1 is engaged with the mounting tubular portion 22, and the mounting tubular portion 22 is correctly positioned on the mounting bracket 32.

Figure 3:
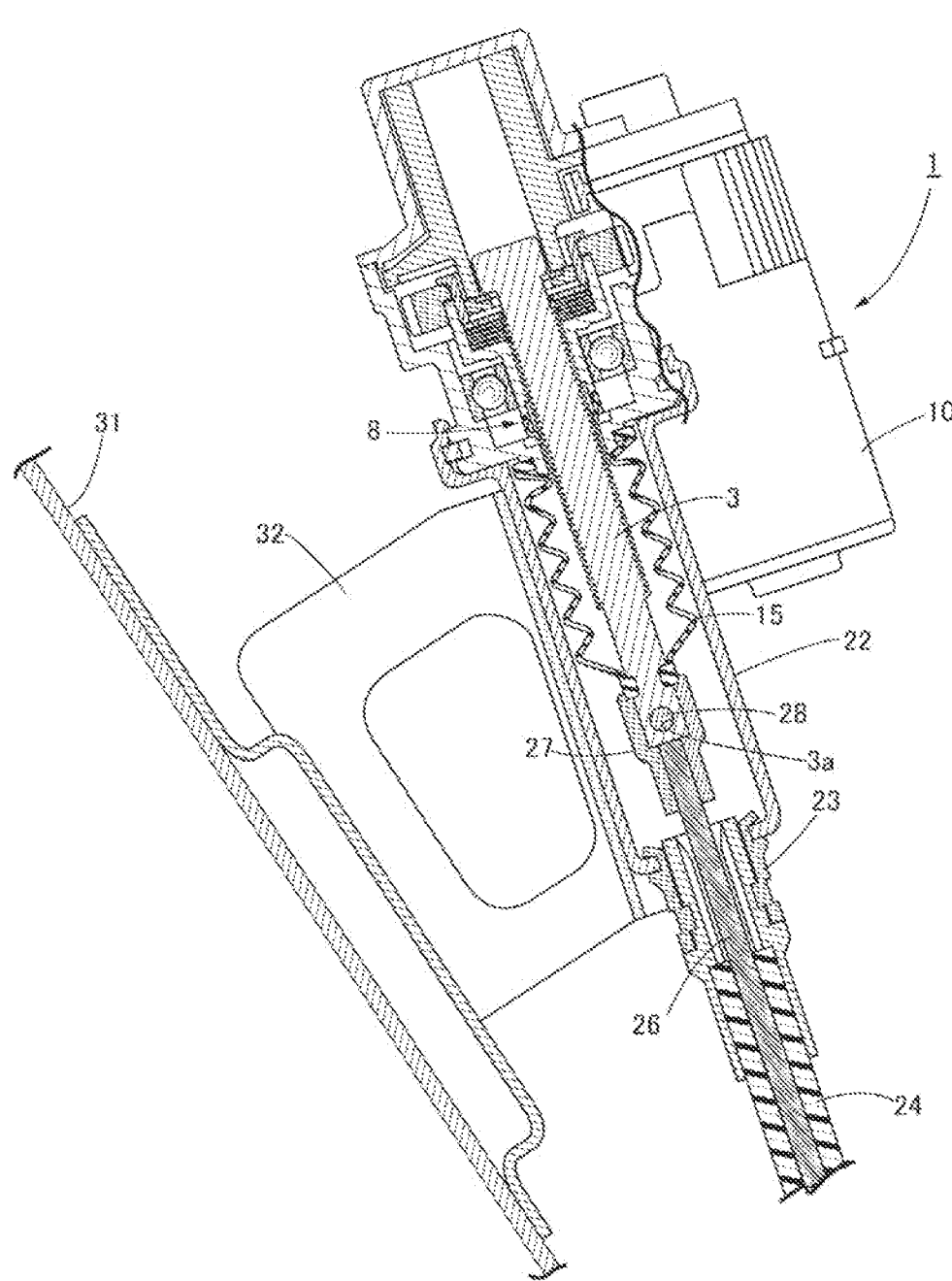
FIG. 3 is a cross-sectional view taken along a line 3-3 illustrated in FIG. 1.

Then, as illustrated in FIG. 3. a portion of the screw shaft 3 of the electric actuator 1 that extends out of the actuator case 10 is covered with an extensible and compressible bellows-like boot 15 made from a flexible and elastic rubber material or the like, and this boot 15 is covered with the mounting tubular portion 22 joined to the mounting bracket 32 by welding. Therefore, a part of the screw shaft 3 and the boot 15 are inserted inside the mounting tubular portion 22. Now, one longitudinal end of the mounting tubular portion 22 is attached to the end portion of the actuator case 10 and extends along the screw shaft 3, and a cylindrical plug 23 is attached to an opening portion on the other longitudinal end of the mounting tubular portion 22. Then, a discharge port 22*a* shaped like a circular hole is formed. near the lowermost end of the mounting tubular portion 22 as illustrated in FIG. 2 with the electric actuator 1 mounted on the hacking plate 31.

Figure 4:
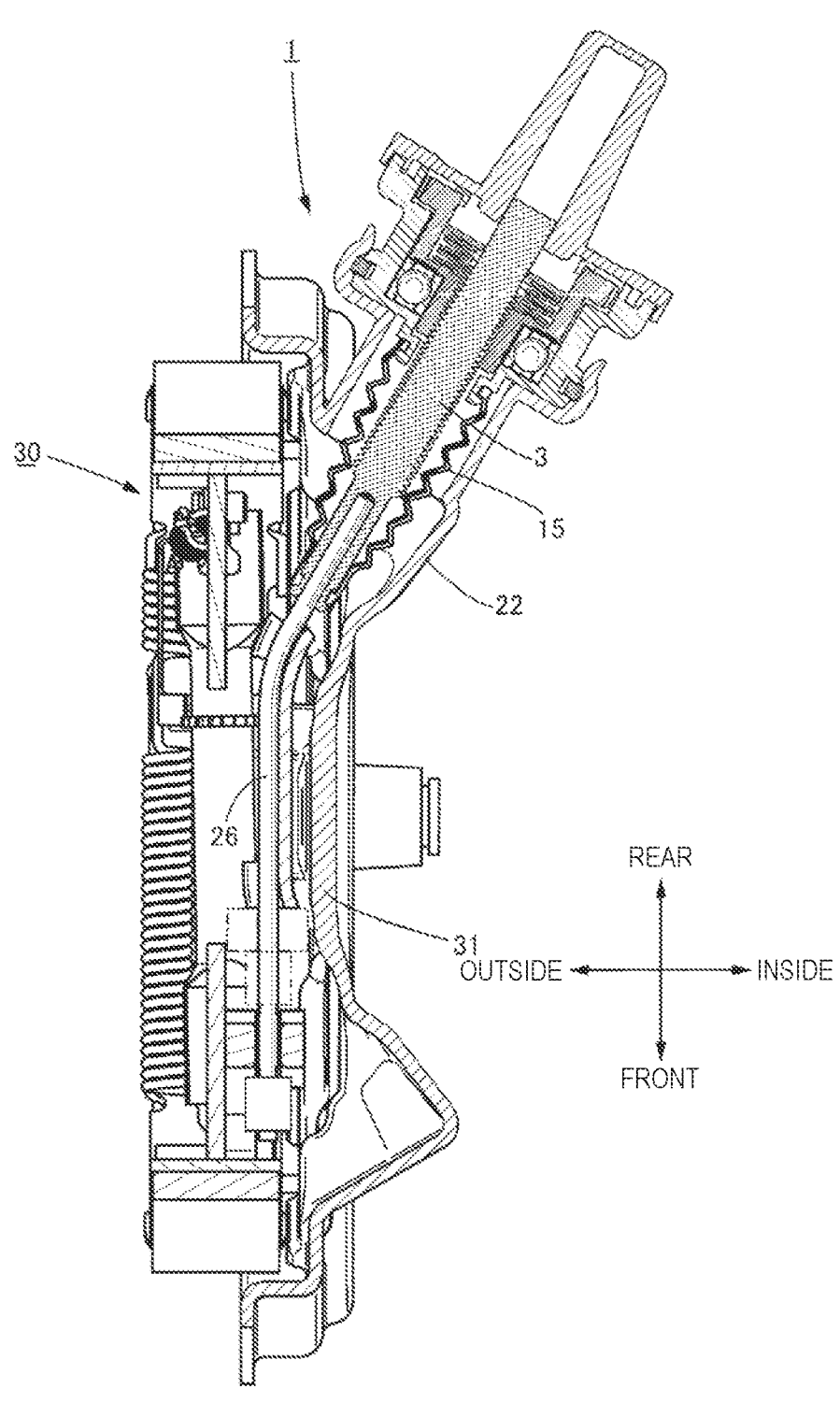
FIG. 4 is a partial cross-sectional view of a vehicle drum brake according to another embodiment of the present invention.

In the present embodiment, the mounting tubular portion 22 and the mounting bracket 32 are configured as different members from the backing plate 31, and the mounting bracket 32 is configured to be attached to the front side of the backing plate 31 using the pluralities of studs 33 and nuts 34 (three for each of them in the present embodiment), so that the position at which the electric actuator 1 is mounted on the backing plate 31 can be easily changed. However, the mounting tubular portion 22 may be configured integrally with the backing plate 31 as illustrated in FIG. 4. Employing such a configuration can contribute to reducing the number of components and the number of assembling man-hours, thereby achieving a cost reduction of the electric parking brake apparatus.

Then, as illustrated in FIG. 3, one end of a deflectable tube 24 is fixed to the plug 23 by being inserted therein, and this tube 24 is bent in a U-like shape after extending from the plug 23 obliquely downward and the other end thereof is fixed to a connector 25 attached at a lower portion of the front side of the hacking plate 31 by being inserted therein as illustrated in FIGS. 1 and 2. Now, the connector 25 is attached to the lower portion of the front side of the hacking plate 31 using two studs 37 and two nuts 38 threadedly engaged with them as illustrated in FIGS. 1 and 2.

Further, as illustrated in FIG. 3, one end of a brake cable 26 is attached to the distal end portion of the screw shaft 3 of the electric actuator 1 via a connector 27. More specifically, the connector 27 is fixed using a pin 28 inserted in a circular hole 3*a* provided at the distal end portion of the screw shaft 3 so as to pierce therethrough, and the one end of the brake cable 26 is fixed to this connector 27 by being inserted therein. Now, the brake cable 26 is inserted through inside the tube 24, and the other end thereof is coupled with one end of the not-illustrated parking brake lever mounted on the back surface side of the backing plate 31.

[Electric Actuator]

Next, the detailed configuration and the operations of the above-described electric actuator 1 according to the present invention will be described now with reference to FIGS. 5 to 8.

Figure 5:
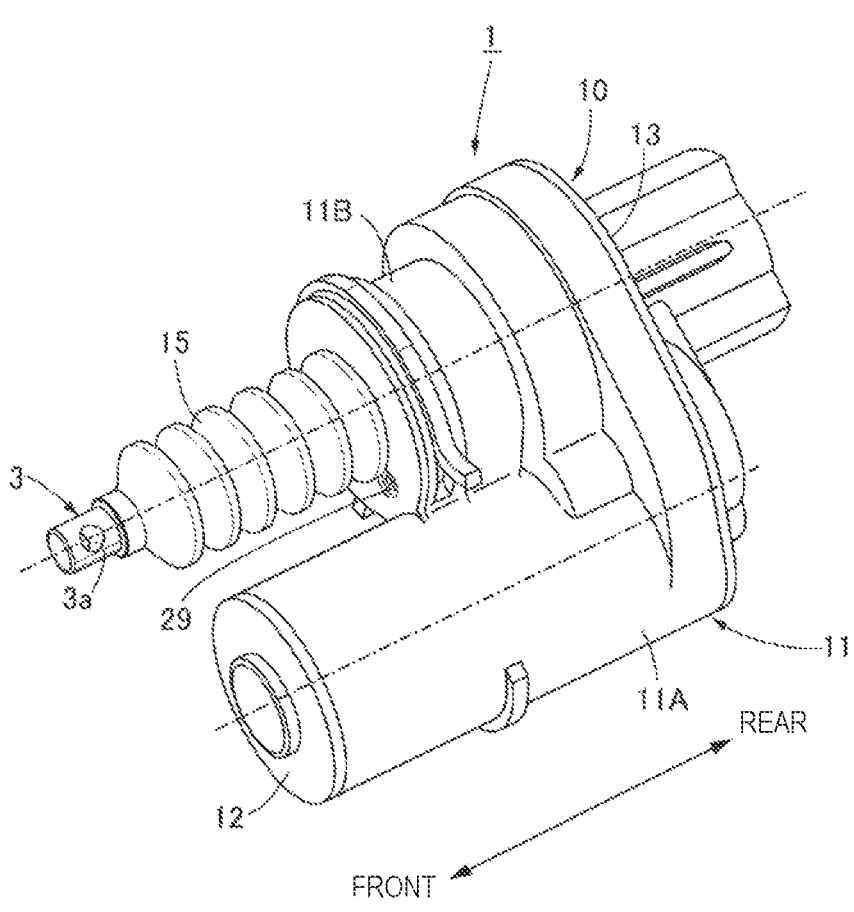
FIG. 5 is a perspective view of an electric actuator according to the present invention.
Figure 6:
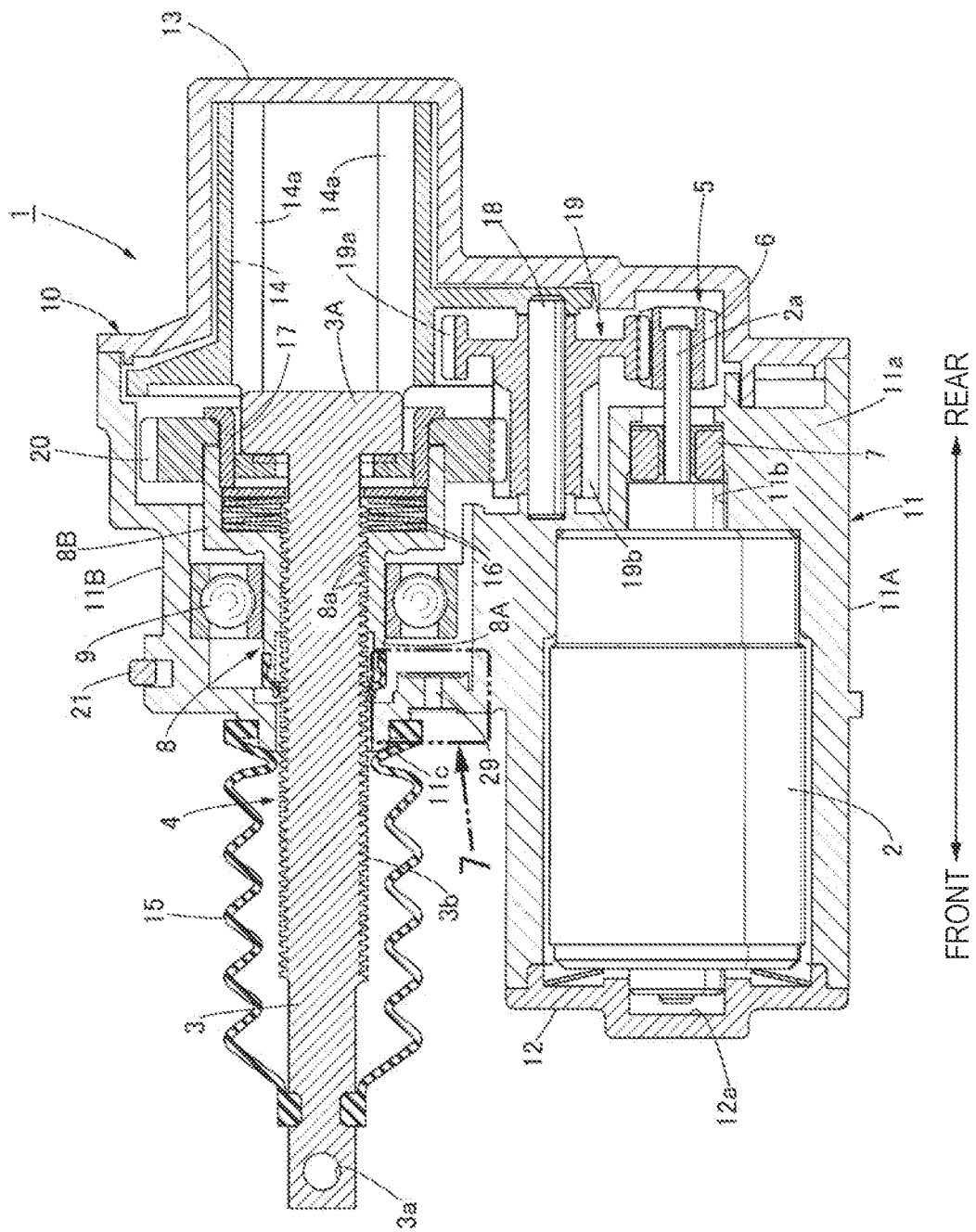
FIG. 6 is a plan cross-sectional view illustrating the electric actuator according to the present invention in a state thereof when a screw shaft advances.
Figure 7:
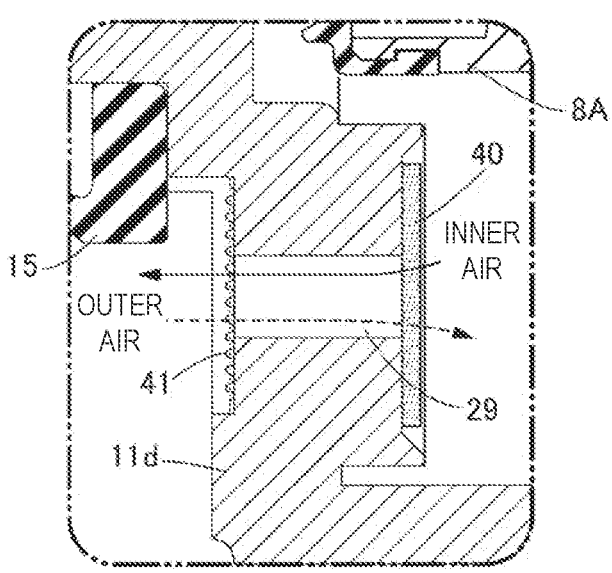
FIG. 7 is an enlarged detailed view of a portion labeled 7 in FIG. 6.
Figure 8:
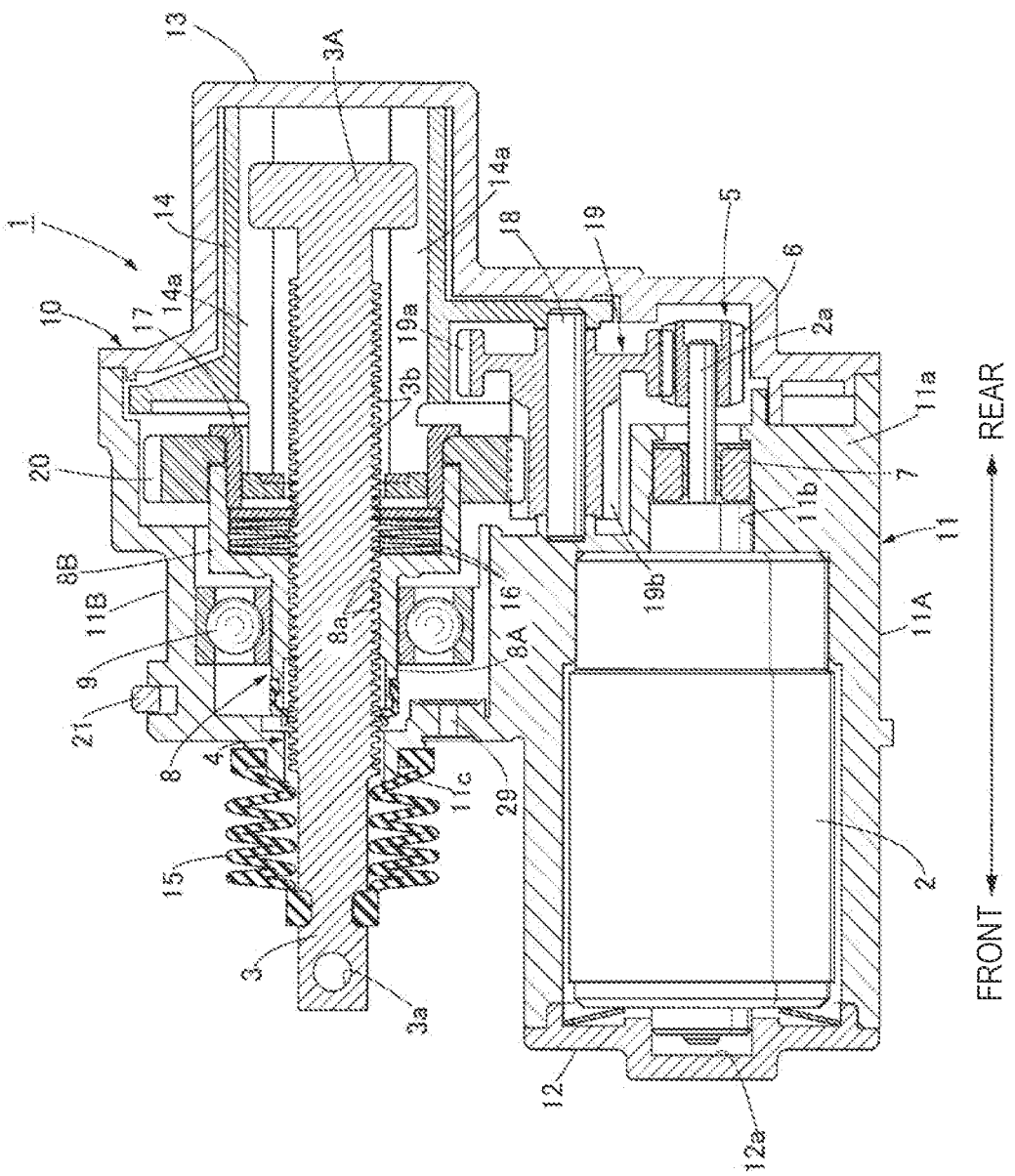
FIG. 8 is a plan cross-sectional view illustrating the electric actuator according to the present invention in a state thereof when the screw shaft retreats.

FIG. 5 is a perspective view of the electric actuator according to the present invention. FIG. 6 is a plan cross-sectional view illustrating this electric actuator in a state thereof when the screw shaft advances. FIG. 7 is an enlarged detailed view of a portion labeled 7 in FIG. 6. FIG. 8 is a plan cross-sectional view illustrating the electric actuator according to the present invention in a state thereof when the screw shaft retreats. in the following description, a direction indicated by arrows illustrated in FIGS. 5, 6, and 8 will be defined to be a "front-rear direction".

The electric actuator 1 according to the present embodiment is intended to be used as the actuator of the electric parking brake apparatus provided to the vehicle drum brake 30 illustrated in FIGS. 1 and 2. Then, as illustrated in FIG. 6, the electric actuator 1 includes an electric motor 2, a motion conversion mechanism 4 that converts a rotation of this electric motor 2 into a reciprocating linear motion of the screw shaft 3, and a transmission mechanism 5 that functions to transmit the rotation of the electric motor 2 to the motion conversion mechanism 4, and these electric motor 2, motion conversion mechanism 4, and transmission mechanism 5 are contained in the actuator case 10.

The above-described actuator case 10 includes a case main body 11, a motor cover 12, and a gear cover 13. The case main body 11 integrally includes a cylindrical first case 11A and a second case 11B. The motor cover 12 is attached to the opening end of the first case 11A of this case main body 11 so as to cover it. The gear cover 13 is attached to the opening end of the case main body 11 so as to cover it from the opposite side from this motor cover 12 (the rear side in FIG. 6).

Then, as illustrated in FIG. 6, the electric motor 2 is contained in the first case 11A of the case main body 11, and a small-diameter driving gear 6 is attached to the end portion (the rear end portion) of an output shaft (a motor shaft) 2*a* extending from this electric motor 2 rearward (to the rear side in FIG. 6) that faces inside the gear cover 13. Now, one axial end (the front end) of the electric motor 2 is fittedly held in a recessed portion 12*a* formed on the motor cover 12, and the other axial end (the rear end) of this electric motor 2 is fittedly held in a circular hole 11*b* formed on an end wall 11*a* of the first case 11A. The output shaft (the motor shaft) 2*a* of the electric motor 2 is rotatably supported on the first case 11A via a bearing 7.

Further, the second case 11B of the case main body 11 is integrally disposed on the side of the first case 11A, and the motion conversion mechanism 4 is contained in this second case 11B. This motion conversion mechanism 4 includes a rotatable nut 8, and the above-described screw shaft 3 threadedly inserted through this nut 8 reciprocally and linearly movably.

The above-described nut 8 integrally includes a sleeve portion 8A and a drum portion 8B large in diameter than this sleeve portion 8A, and is rotatably supported on the second case 11B via a radial bearing (a ball bearing) 9 set on the outer periphery of the sleeve portion 8A. Now, a female screw 8*a* is helically provided by being engraved on the inner periphery of the sleeve portion 8A.

The screw shaft 3 is a round rod-shaped slide member elongated in the front-rear direction, and the one end of the brake cable 26 is coupled with the front end portion thereof via the connector 27 as illustrated in FIG. 3. Further, a flange portion 3A is integrally formed at the rear end of the screw shaft 3, and the outer periphery of this flange portion 3A is engaged with a pair of guide grooves 14*a* formed along the axial direction on the inner periphery of a tubular guide member 14 contained in the gear cover 13. Therefore, the rotation of the screw shaft 3 is prohibited by the guide member 14, and the screw shaft 3 linearly reciprocates in the front-rear direction without rotating.

Then, a male screw 3*b* is helically provided by being engraved in a predetermined range of the outer periphery of the screw shaft 3. The screw shaft 3 is threadedly inserted through the sleeve portion 8A of the nut 8 so as to be able to advance and retreat. The male screw 3*b* provided by being engraved on the outer periphery of this screw shaft 3 and the female screw 8*a*. provided by being engraved on the inner periphery of the sleeve portion 8A of the nut 8 are threadedly engaged with each other at the portion of the screw shaft 3 inserted through the nut 8.

Further, the portion of the screw shaft 3 that extends out of the actuator case 10 is covered with the bellows-like boot 15 as described above. One end (the front end) of this boot 15 is fittedly attached to the outer periphery of the front end portion of the screw shaft 3, and the other end (the rear end) of the boot 15 is fittedly attached to the outer periphery of a tubular portion 11*c* provided in a protruding manner integrally on the second case 11B of the actuator case 10.

Then, in the present embodiment, the vent 29 is formed near the screw shaft 3 of the second case 11B of the actuator case 10 as illustrated in FIGS. 5 and 6. The vent 29 serves as a breather mechanism that ventilates a sealingly closed space in this actuator case 10 and the boot 15. More specifically, an end wall 11*d*, through which the screw shaft 3 extends, is provided to the second case 11B, and the vent 29 shaped like a circular hole is formed near the screw shaft 3 on this end wall 11*d*. Then, as illustrated in FIG. 7 in detail, a breathable waterproof member 40 is attached on the inner space side (the right side in FIG. 7) of the vent 29, and a filter 41 is attached to the outer space side (the left side in FIG. 7) of this vent 29. Now, the breathable waterproof member 40 is a member that has a function of blocking entry and exit of water while permitting entry and exit of air into and out of the sealingly closed space in the actuator case 10 arid the boot 15, and this breathable waterproof member 40 and the filter 41 are fixed to around the vent 29 on the end wall 11*d* of the second case 11B by heat sealing in the present embodiment. Both the breathable waterproof member 40 and the filter 41 are fixed by heat sealing in the present embodiment, but any one of them may be fixed by heat sealing and the attachment of these members is not limited to the present embodiment. Then, the present embodiment employs the configuration in which the vent 29 formed on the actuator case 11B is covered with the mounting tubular portion 22.

Further, as illustrated in FIG. 6, a plurality of disc springs 16 is contained in an axially stacked state in an axial space formed between the drum portion 8B and the flange portion 3A of the screw shaft 3 inside the drum portion 8B of the nut 8, and the axial positions of these disc springs 16 are regulated by a retainer 17 in abutment with a driven gear 20. These disc springs 16 form a biasing unit that biases the screw shaft 3 in a direction away from the nut 8 (rearward).

Now, in the following description, the configuration of the transmission mechanism 5 will be described with reference to FIG. 6.

The transmission mechanism 5 functions to transmit the rotation of the output shaft 2a of the electric motor 2 to the nut 8 of the motion conversion mechanism 4, and includes the above-described driving gear 6 attached to the output shaft 2a of the electric motor 2, an intermediate gear 19 rotatably supported by a support shaft 18, and the driven gear 20 attached on the outer periphery of the drum portion 8B of the nut 8.

The above-described intermediate gear 19 is rotatably supported by the support shaft 18 provided so as to hang across between the case main body 11 of the actuator case 10 and the guide member 14, and integrally includes a large-diameter intermediate gear 19a and a small-diameter intermediate gear 19b having large and small different diameters, respectively. Now, the large-diameter intermediate gear 19a is meshed with the driving gear 6, and the diameter thereof is set to be larger than the diameter of the driving gear 6. Further, the small-diameter intermediate gear 19b is meshed with the driven gear 20 larger in diameter than that, and the driven gear 20 is fittedly attached to the outer periphery of the drum portion 8B of the nut 8.

Then, the electric actuator 1 configured in the above-described manner is used as the actuator of the electric parking brake apparatus as described above, and the operations of this electric actuator 1 will be described now.

The state illustrated in FIG. 6 is a state in which the screw shaft 3 advances and the brake cable 26 (refer to FIG. 3) attached at the distal end of this screw shaft 3 is loosened, and the brake shoes of the drum brake 30 illustrated in FIGS. 1 and 2 are separated from the inner peripheral surface of the brake drum in this state. Therefore, no frictional resistance force is generated between the brake shoes and the brake drum, and the electric parking brake apparatus is in a state that the parking brake is released.

When a not-illustrated parking brake switch is operated to ON from the above-described state, power is supplied to the electric motor 2 of the electric actuator 1, and this electric motor 2 is started up. Then, the rotation of the output shaft 2a of the electric motor 2 is transmitted to the motion conversion mechanism 4 while being slowed down by the transmission mechanism 5, and the rotation of the output shaft 2a of the electric motor 2 is converted into the linear motion (the rearward motion) of the screw shaft 3, More specifically, the rotation of the output shaft 2a of the electric motor 2 is transmitted while being slowed down from the driving gear 6 to the intermediate gear 19, and this intermediate gear 19 rotates at a predetermined speed. Then, the rotation of this intermediate gear 19 is transmitted to the nut 8 of the motion conversion mechanism 4 while being slowed down via the small-diameter intermediate gear 19b and the driven gear 20 meshed with each other, and this nut 8 rotates at a predetermined speed.

As described above, when the nut 8 rotates, the screw shaft 3 threadedly inserted through this nut 8 linearly moves and retreats as illustrated in FIG. 8, and the brake cable 26 (refer to FIG. 3) attached to the distal end of this screw shaft 3 is pulled thereby. Accordingly, the parking brake lever of the electric parking brake apparatus is pulled by the brake cable 26 to thus spread open the brake shoes, and these brake shoes are pressed against the inner peripheral surface of the brake drum, as a result of which a frictional resistance force is generated between them. Then, the rotations of the brake drum and the wheel are braked due to this frictional resistance force, and therefore the vehicle is brought into the parking brake state.

In this manner, when the screw shaft 3 retreats as illustrated in FIG. 8, this screw shaft 3 enters the sealingly closed space in the actuator case 10 and the boot 15. At this time, if the vent 29 is not formed on the end wall 11d of the second case 11B, the air in the sealingly closed space compresses to thus create a positive inner pressure in this sealingly closed space because the volume of the sealingly closed space reduces by an amount corresponding to the volume of the entry of the screw shaft 3, and the boot 15 expands due to this positive pressure, leading to occurrence of various troubles as described above.

In light thereof, in the present embodiment, the vent 29 is formed on the end wall 11d of the second case 11B serving as the breather mechanism, and therefore the air (the inner air) in the sealingly closed space is discharged to outside via the vent 29 as indicated by a solid arrow in FIG. 7. As a result, the inner pressure in the sealingly closed space is kept at approximately the atmospheric pressure, and a trouble such as the expansion of the boot 15 is kept from occurring, The present configuration allows the electric actuator 1 to also inhibit a change in the inner pressure due to a change in the altitude or the temperature without being limited to the reciprocating linear motion of the screw shaft 3.

Next, when the not-illustrated parking brake switch is operated to OFF with the aim of releasing the above-described parking lock state, the electric motor 2 rotates reversely, and the rotation of the output shaft 2a thereof is transmitted to the nut 8 of the motion conversion mechanism 4 via a transmission route similar to the above-described route, and therefore this nut 8 rotates reversely. When the nut 8 rotates reversely in this manner, the screw shaft 3 threadedly inserted through this nut 8 linearly moves and advances, and the electric actuator 1 returns to the state illustrated in FIG. 6, as a result of which the parking brake of the electric parking brake apparatus is released.

In this manner, when the screw shaft 3 advances as illustrated in FIG. 6, this screw shaft 3 exits the sealingly closed space in the actuator case 10 and the boot 15, and therefore the inner pressure in the sealingly closed space reduces by an amount corresponding to the volume of this exit portion. At this time, if the vent 29 is not formed on the end wall 11d of the second case 11B, the air in the sealingly closed space expands to thus create a negative inner pressure in this sealingly closed space because the volume of the sealingly closed space increases by an amount corresponding to the volume of the exit of the screw shaft 3, and the boot 15 dents due to this negative pressure, leading to occurrence of various troubles as described above.

In light thereof, in the present embodiment, the vent 29 is formed on the end wall 11d of the second case 11B, and therefore the outer air flows into the sealingly closed space via the vent 29 as indicated by a dashed arrow in FIG. 7. As a result, the inner pressure in the sealingly closed space is kept at approximately the atmospheric pressure, and a trouble such as the denting of the boot 15 is kept from occurring. In this case, because the outer air flows into the sealingly closed space after passing through the filter 41 and the breathable waterproof member 40, a foreign object contained in the outer air is removed by the filter 41, and the breathable waterproof member 40 is kept from being clogged due to the foreign object and the function of this breathable waterproof member 40 is kept from being impaired. Further, because entry of moisture contained in the outer air into the sealingly closed space is blocked by the breathable waterproof member 40, the functions of the electric motor 2, the motion conversion mechanism 4, the transmission mechanism 5, and the like contained in the sealingly closed space are kept from being impaired, and the operational stability of them can be enhanced. Further, due to the provision of the cylindrical mounting tubular portion 22 serving as the cover member that covers the vent 29, the vent 29 is kept from being exposed to the atmosphere, and entry of a foreign object from outside can be blocked.

In this manner, the present embodiment establishes the communication of the sealingly closed space in the actuator case 10 and the boot 15 to the atmosphere with the simple structure of only forming the vent 29 on the second case 11B of the actuator case 10, thereby inhibiting a change in the inner pressure in the sealingly closed space due to the sliding motion of the screw shaft 3. Therefore, the present embodiment can inhibit the expansion and the contraction of the boat 15 to thus achieve the improvement of the durability thereof with the simple structure without causing an increase in the number of components and the complication of the structure and leading to a cost increase accompanying them. Especially, the present embodiment includes the vent 29 formed near the screw shaft 3 of the second case 11B, and therefore can effectively inhibit a change in the pressure in the boot 15 according to the sliding motion of the screw shaft 3 and thus achieve the improvement of the durability and the sealing performance of the boot 15. The present embodiment can achieve the simplification of the structure and the cost reduction of the electric actuator 1 and also enhance the durability of the boot 15 in this manner, thereby achieving the simplification of the structure, a cost reduction, and the improvement of the durability and the operational stability of the vehicle drum brake 30 including this electric actuator 1 as a result thereof.

Further, water can be securely prevented from entering the sealingly closed space via the vent 29 due to the breathable waterproof member 40 provided on the vent 29, and therefore high operational stability of the electric actuator 1 can be maintained. Then, the present embodiment includes the breathable waterproof member 40 provided on the inner space side of the vent 29 and the filter 41 provided on the outer space side of this vent, thereby removing the foreign object contained in the outer air by the filter 41 and preventing the breathable waterproof member 40 from being clogged due to the foreign object. Further, the present embodiment allows the breathable waterproof member 40 and the filter 41 to be easily fixed by heat sealing.

Then, the present embodiment includes the discharge port 22a formed near the lowermost portion of the mounting tubular portion 22 as illustrated in FIG. 2, thereby realizing excellent ventilation in the mounting tubular portion 22 via this discharge port 22a and also allowing water and the like introduced into the mounting tubular portion 22 to be discharged to outside via the discharge port 22a.

Further, because the portion of the screw shaft 3 that extends out of the actuator case is inserted in the mounting tubular portion 22, the boot 15 covering the portion of the screw shaft 3 that extends out of the actuator case 10 is protected by the mounting tubular portion 22 and this hoot 15 is prevented from incurring damage due to an external force, thereby enhancing the durability thereof.

The above-described embodiments have been described citing the configuration in which the electric actuator according to the present invention is applied to the electric parking brake apparatus of the vehicle drum brake, but the electric actuator according to the present invention is also applicable to an actuator used in another arbitrary apparatus.

Besides that, it is apparent that the applicability of the present invention shall not be limited to the above-described embodiments, and can he modified in various manners within the scope of the technical idea recited in the claims, the specification, and the drawings.

The invention claimed is:

1. An electric actuator comprising:
   a forwardly and reversely rotatable electric motor;
   a motion conversion mechanism configured to convert a rotation of the electric motor into a reciprocating linear motion of a screw shaft;
   an actuator case containing the electric motor and the motion conversion mechanism; and
   a boot covering a portion of the screw shaft that extends out of the actuator case,
   wherein a vent is formed on the actuator case, the vent being configured to ventilate a sealingly closed space in the actuator case and the boot, and a breathable waterproof member is provided on the vent and a cover member is also provided on the vent, the breathable waterproof member being configured to block entry and exit of water while permitting entry and exit of air, the cover member being configured to cover the vent so as to allow ventilation with outer air, and
   wherein the breathable waterproof member is provided on one side of the vent where the sealingly closed space is located, and a filter is provided on the other side of the vent where the cover member is located.

2. The electric actuator according to claim 1, wherein the actuator case includes a first case containing the electric motor and a second case containing the motion conversion mechanism, and
   wherein the vent is formed near the screw shaft on the second case.

3. The electric actuator according to claim 1, wherein at least one of the breathable waterproof member or the filter is fixed to the vent by heat sealing.

4. A vehicle drum brake configured to spread open/contract a brake shoe provided on a backing plate by an electric actuator, thereby pressing/stopping pressing the brake shoe against an inner periphery of a brake drum that rotates together with a wheel to generate/release a required braking force, the electric actuator comprising:
   a forwardly and reversely rotatable electric motor;
   a motion conversion mechanism configured to convert a rotation of the electric motor into a reciprocating linear motion of a screw shaft;
   an actuator case containing the electric motor and the motion conversion mechanism; and
   a boot covering a portion of the screw shaft that extends out of the actuator case,
   wherein a vent is formed on the actuator case, the vent being configured to ventilate a sealingly closed space in the actuator case and the boot, and a breathable waterproof member is provided on the vent and a cover member is also provided on the vent, the breathable waterproof member being configured to block entry and exit of water while permitting entry and exit of air, the cover member being configured to cover the vent so as to allow ventilation with outer air, and wherein the cover member is a mounting tubular portion for fixing the electric actuator to the backing plate.

5. The vehicle drum brake according to claim 4, wherein the mounting tubular portion is integrally formed on the backing plate, and the portion of the screw shaft that extends out of the actuator case is inserted in the mounting tubular portion, by which the electric actuator is fixed to the backing plate.

6. The vehicle drum brake according to claim 4, wherein the mounting tubular portion is attached to the backing plate via a mounting member fixed to the backing plate, and the portion of the screw shaft that extends out of the actuator case is inserted in the mounting tubular portion, by which the electric actuator is fixed to the backing plate.

7. The vehicle drum brake according to claim 6, wherein the mounting tubular portion is a tubular member, and a discharge port is formed near a lowermost portion thereof.

\* \* \* \* \*